United States Patent [19]
Lavie et al.

[11] Patent Number: 5,785,079
[45] Date of Patent: Jul. 28, 1998

[54] FLUID DISTRIBUTION VALVE

[75] Inventors: Alain François Jean Lavie, Yerres; Claude Marcel Joseph Maillard, Vulaines sur Seine, both of France

[73] Assignee: Societe Nationale D'Etude et de Construction de Moteurs D'Aviation "Snecma", Paris, France

[21] Appl. No.: 641,031

[22] Filed: Apr. 30, 1996

[30] Foreign Application Priority Data

May 3, 1995 [FR] France .................. 95 05257

[51] Int. Cl.$^6$ ........................ G05D 7/01
[52] U.S. Cl. ........................ 137/502; 137/495
[58] Field of Search ............... 137/495, 502, 137/115.11

[56] References Cited

U.S. PATENT DOCUMENTS

| | | | |
|---|---|---|---|
| 2,988,885 | 6/1961 | Schnaible | 137/115.11 |
| 3,365,883 | 1/1968 | Alberani et al. | 137/495 X |
| 3,384,020 | 5/1968 | Searle | 137/115.11 |
| 3,957,075 | 5/1976 | Kunz et al. | 137/115.11 |

FOREIGN PATENT DOCUMENTS

| | | |
|---|---|---|
| 0 313 502 | 4/1989 | European Pat. Off. . |
| 2089939 | 6/1982 | United Kingdom ........ 137/502 |

*Primary Examiner*—Stephen M. Hepperle
*Attorney, Agent, or Firm*—Oblon, Spivak, McClelland, Maier & Neustadt, P.C.

[57] ABSTRACT

A valve is disclosed which is adapted to be disposed between a first chamber and a second chamber for the purpose of selectively interconnecting the two chambers or isolating them from one another. The valve comprises a body, a sleeve disposed therein and provided with a number of orifices which open into a first duct in the body for the delivery of fluid to the second chamber, and a piston which is slidable in the sleeve to close or open the orifices and which separates a feed chamber communicating with the first chamber from a control chamber communicating, by way of a second duct, with the throat of a venturi formed in the first duct. The opposite faces of the piston are thus both exposed to the fluid, and a spring is provided in the control chamber for biassing the piston towards closing the orifices.

1 Claim, 1 Drawing Sheet

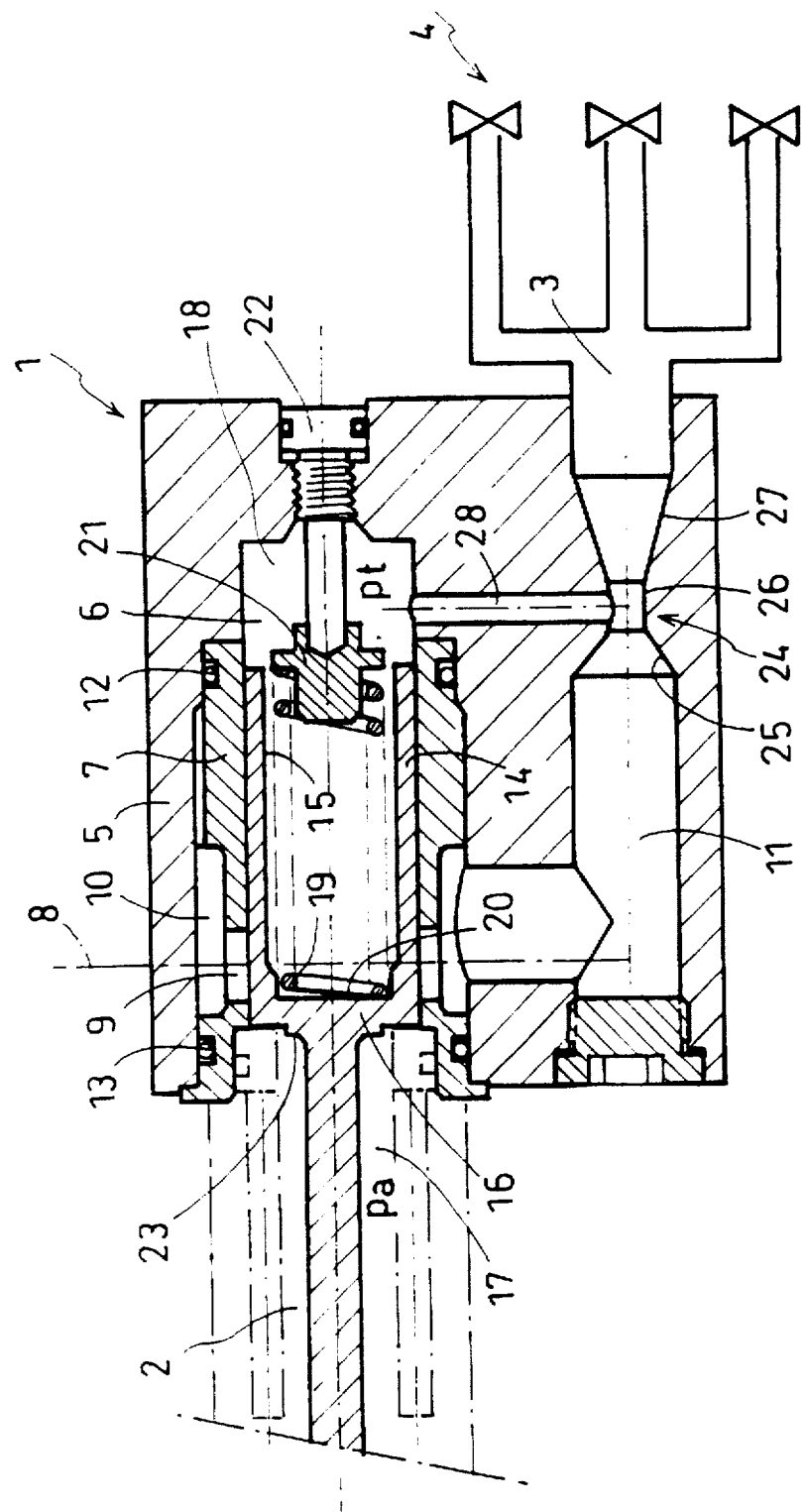

FLUID DISTRIBUTION VALVE

BACKGROUND OF THE INVENTION

1. Field of the Invention

The invention relates to a fluid distribution valve adapted to be interposed between a first chamber and a second chamber for the purpose of selectively interconnecting the two chambers or isolating them from eachother, the valve comprising a body having an internal cavity, a sleeve disposed in the cavity and having a number of orifices opening into a duct which is formed in the body for the delivery of fluid to the second chamber, and a piston which is slidable in the sleeve so as to close or open the orifices and which divides the body cavity into a control chamber and a feed chamber for communication with the first chamber, the piston being actuated in response to the pressures in the feed chamber and the control chamber and being biased by resilient means so as to close the orifices in the absence of pressure in the feed chamber.

Such a valve is used inter alia in the fuel supply system of an afterburner unit in a turbomachine. The fuel supply system of such a unit includes a pump, a fuel flow controller and fuel injection devices. Valves for isolating the injectors must be disposed between the injectors and the fuel flow controller since the afterburner unit is used only on an as-required basis, and it is to isolating valves of this kind that the invention relates.

2. Summary of the Prior Art

In conventional valves of this type, the control chamber communicates with a zone disposed downstream of the engine turbine, and is therefore supplied with air. Since the piston has one face exposed to the fuel and the other surface in contact with air, a fluid-tight seal must be provided between the sleeve and the piston. Also, it should be noted that the fuel pressure may reach as much as 75 bar whereas the pressure in the control chamber will be less than 10 bar, and usually between 5 and 7 bar.

Clearly, failure of the seal could be very troublesome. Because the fuel pressure is considerable higher than the air pressure, fuel would leak towards the downstream end of the turbine when the afterburner unit is in operation, and this would cause substantial local overheating in the engine.

SUMMARY OF THE INVENTION

It is the object of the invention to avoid this risk by doing away with the air supply circuit to the control chamber.

Instead, the invention proposes to provide a venturi in the first duct which delivers fluid to the second chamber, and to communicate the control chamber with the throat of the venturi by way of a second duct.

More specifically, the invention provides a fluid distribution valve adapted to be interposed between a first chamber and a second chamber for the purpose of selectively placing said first and second chambers in communication with eachother or isolating them from each other, said valve comprising a body defining an internal cavity, a sleeve disposed in said internal cavity, means defining a first duct in said body for the delivery of fluid to said second chamber, said sleeve being provided with at least one orifice which opens into said first duct, a piston slidably mounted in said sleeve so as to close or open said at least one orifice, said piston dividing said internal cavity into a feed chamber for communication with said first chamber and a control chamber whereby said piston is actuated in response to the pressures prevailing in said feed chamber and said control chamber, resilient means biasing said piston to close said at least one orifice in the absence of pressure in said feed chamber, a venturi provided in said first duct, and means defining a second duct which communicates said control chamber with said venturi at the throat thereof.

In such a valve both surfaces of the piston are exposed to the delivered fuel, and any leakage past the piston due to faulty sealing drains away towards the second chamber. Also, a weight reduction is achieved as there is no longer any need to provide a low pressure air supply duct to the control chamber.

Furthermore, the control pressure associated with the venturi varies very little and can be regarded as constant. To produce a pressure level in the control chamber of the same level as is produced by air in conventional values, the diameter of the venturi throat should be of the order of a few millimeters.

Other advantages and preferred features of the invention will become apparent from the following description, with reference to the accompanying drawing, of the preferred embodiment.

BRIEF DESCRIPTION OF THE DRAWING

The sole FIGURE shows a axial section through a preferred embodiment of the valve according to the invention.

DESCRIPTION OF THE PREFERRED EMBODIMENT

In the drawing, the reference 1 denotes an isolating valve disposed between a first chamber 2 and a second chamber 3. The first chamber 2 is, for example, a fuel feed duct and the second chamber 3 is a circuit for delivering fuel to injectors 4 disposed in an afterburner chamber of a turbojet engine. The valve 1 has a body 5 formed with a cylindrical internal cavity 6, and a sleeve 7 is disposed in the cavity 6. The sleeve 7 is provided with a number of orifices 9 in a radial plane 8, and these orifices 9 open into an annular groove 10 in the outer wall of the sleeve. The groove 10 communicates with the second chamber 3 by way of a delivery duct 11 formed in the wall of the valve body 5. Seals 12, 13 are disposed between the sleeve 7 and the valve body 5.

A piston 14 is slidably mounted in the sleeve 7. The piston 14 has a skirt 15 for guiding the piston 14 in the sleeve 7, and an end wall 16 which divides the internal cavity of the body 5 into a fuel feed chamber 17 in permanent communication with the first chamber 2, and a control chamber 18. A compression spring 19 is disposed in the control chamber 18 such that the spring acts between the inner face 20 of the end wall 16 and a bearing member 21 carried by a tension-adjusting screw mounted in the valve body 5. The spring 19 biasses the piston 14 to the left in the drawing so that the piston 14 closes the sleeve orifices 9. The outer face 23 of the piston end wall 16 is exposed to the feed pressure Pa in the feed chamber 17, whereas the other face 20 of the piston 14 is acted upon by the pressure Pt in the control chamber 18 and the force F of the spring 19.

If S denotes the cross-sectional area of the piston 14, the latter will be in equilibrium when:

$$(Pa \times S) = (Pt \times S) + F.$$

As the drawing shows, the delivery duct 11 has a venturi 24 defined by a convergent part 25, a throat 26 and a divergent part 27. Also, a second duct 28 communicates the control chamber 18 with the throat 26.

The pressure in the control chamber 18 is therefore equal to the pressure Pc which is operative in the throat 26, and is less than the pressure in the feed chamber 17.

The pressure conditions in the throat 26 are defined by the following formula:

$$D = K \times ((P_a - P_c)/w)^{1/2}$$

wherein:

D is the rate of fuel flow;
K is the characteristic coefficient of the venturi;
Pa is the fuel pressure in the feed chamber 17;
Pc is the pressure in the venturi throat 26; and
w is the density of the fuel.

The venturi throat diameter d is a few millimeters, and is so calculated that the pressure Pc in the throat 26 is of the order of 5 to 6 bar, corresponding to the value of the control pressure in conventional isolating valves in which the control chamber communicates with a zone downstream of the turbine of the turbojet engine. The throat diameter d is also so calculated that the pressure drop in the delivery duct 11 due to the presence of the venturi 24 remains within acceptable limits.

With the valve construction described, both the piston faces 20, 23 are immersed in fuel. The dynamic seal usually provided between the piston skirt 15 and the sleeve 7 can therefore be omitted. If there is a substantial clearance between the skirt 15 and the sleeve 7, the fuel leaking past the piston will discharge through the second duct 28 to the divergent part 27 of the venturi in the delivery duct 11.

The valve described above can be used advantageously in the fuel distribution circuit of an afterburner chamber in a turbojet engine. However, it can also be used in other applications, and for the delivery of any type of liquid or gaseous fluid.

We claim:

1. A fluid distribution valve adapted to be interposed between a first chamber and a second chamber for the purpose of selectively placing said first and second chambers in communication with eachother or isolating them from each other, said valve comprising a body defining an internal cavity, a sleeve disposed in said internal cavity, means defining a first duct in said body for the delivery of fluid to said second chamber, said sleeve being provided with at least one orifice which opens into said first duct, a piston slidably mounted in said sleeve so as to close or open said at least one orifice, said piston dividing said internal cavity into a feed chamber for communication with said first chamber and a control chamber whereby said piston is actuated in response to the pressures prevailing in said feed chamber and said control chamber, resilient means biassing said piston to close said at least one orifice in the absence of pressure in said feed chamber, a venturi provided in said first duct, and means defining a second duct which communicates said control chamber with said venturi at the throat thereof.

* * * * *

UNITED STATES PATENT AND TRADEMARK OFFICE
CERTIFICATE OF CORRECTION

PATENT NO. : 5,785,079

DATED : July 28, 1998

INVENTOR(S) : Alain François Jean Lavie et al.

It is certified that error appears in the above-indentified patent and that said Letters Patent is hereby corrected as shown below:

column 1, line 9, "eachother" should be --each other--;
column 1, line 40, "considerable" should be --considerably--;
column 1, line 57, "eachother" should be --each other--;
column 4, line 9, "eachother" should be --each other--.

Signed and Sealed this

Twenty-third Day of February, 1999

Attest:

Q. TODD DICKINSON

*Attesting Officer*  *Acting Commissioner of Patents and Trademarks*